(12) United States Patent
Huntzinger

(10) Patent No.: US 11,039,585 B1
(45) Date of Patent: Jun. 22, 2021

(54) MODULAR HYDROPONIC GROWING SYSTEM

(71) Applicant: Cody Huntzinger, Salt Lake City, UT (US)

(72) Inventor: Cody Huntzinger, Salt Lake City, UT (US)

( * ) Notice: Subject to any disclaimer, the term of this patent is extended or adjusted under 35 U.S.C. 154(b) by 379 days.

(21) Appl. No.: 16/195,948

(22) Filed: Nov. 20, 2018

(51) Int. Cl.
  *A01G 31/00* (2018.01)
  *A01G 31/06* (2006.01)
  *A01G 9/24* (2006.01)
  *A01G 9/10* (2006.01)

(52) U.S. Cl.
  CPC ............. *A01G 31/06* (2013.01); *A01G 9/102* (2013.01); *A01G 9/24* (2013.01)

(58) Field of Classification Search
  CPC .. A01G 31/06; A01G 2031/006; A01G 31/02; A01G 27/02; A01G 27/003; A01G 9/023; A01G 9/14; A01G 9/24; A01G 9/246; A01G 9/247; A01G 9/26; A01G 9/249; A01G 9/20; A01G 7/045
  See application file for complete search history.

(56) References Cited

U.S. PATENT DOCUMENTS

| | | | |
|---|---|---|---|
| 2,928,211 A * | 3/1960 | Martin | A01G 31/06 47/60 |
| 3,424,231 A * | 1/1969 | Truhan | F24F 3/153 165/230 |
| 4,279,101 A | 7/1981 | Leroux | |
| 5,385,589 A | 1/1995 | Kratky | |
| 6,219,966 B1 | 4/2001 | Lapointe | |
| 6,255,103 B1 * | 7/2001 | Tamaoki | C12M 37/00 219/407 |
| 6,725,598 B2 * | 4/2004 | Yoneda | A01G 9/246 47/60 |
| 6,860,163 B2 | 3/2005 | Tocquin | |
| 7,617,057 B2 * | 11/2009 | May | A01G 9/16 702/62 |
| 8,443,546 B1 * | 5/2013 | Darin | A01G 31/02 47/60 |
| 8,910,419 B1 * | 12/2014 | Oberst | A01G 31/06 47/60 |
| D750,996 S | 3/2016 | Butler | |
| 9,288,948 B2 * | 3/2016 | McNamara | A01G 7/045 |

(Continued)

*Primary Examiner* — Trinh T Nguyen
(74) *Attorney, Agent, or Firm* — Kyle A. Fletcher, Esq.

(57) ABSTRACT

The modular hydroponic growing system comprises a collection of one or more independent growing units. Each of the independent growing units provides a controlled enclosed environment for growing plants. Each of the independent growing units monitors and controls the temperature and moisture levels in the controlled enclosed environment. Each of the independent growing units monitors and controls the level of nutrients provided to the growing plants. Each of the independent growing units is identical. Each of the independent growing units comprises a container, a lid, and a management system. The management system and the lid attach to the container. The lid provides access into the controlled enclosed environment. The lid encloses the controlled enclosed environment. The management system monitors and controls the temperature and moisture levels in the controlled enclosed environment. The management system monitors and controls the level of nutrients provided to the growing plants.

18 Claims, 7 Drawing Sheets

(56) References Cited

U.S. PATENT DOCUMENTS

| | | | | |
|---|---|---|---|---|
| 10,455,777 | B1* | 10/2019 | Dennison | A01G 7/045 |
| 10,499,574 | B2* | 12/2019 | Lu | A01G 31/02 |
| 2003/0005626 | A1* | 1/2003 | Yoneda | A01G 9/249 |
| | | | | 47/69 |
| 2005/0039397 | A1* | 2/2005 | Roy | A01G 31/02 |
| | | | | 47/62 R |
| 2006/0150497 | A1 | 7/2006 | Kaprielian | |
| 2009/0223128 | A1 | 9/2009 | Kuschak | |
| 2010/0115834 | A1* | 5/2010 | Miyahara | A01G 9/16 |
| | | | | 47/65.5 |
| 2014/0115958 | A1* | 5/2014 | Helene | A01G 31/06 |
| | | | | 47/17 |
| 2014/0318012 | A1* | 10/2014 | Fujiyama | A01G 31/02 |
| | | | | 47/62 R |
| 2016/0212954 | A1* | 7/2016 | Argento | A01G 31/02 |
| 2018/0007845 | A1* | 1/2018 | Martin | A01G 9/246 |
| 2018/0184602 | A1* | 7/2018 | Ofir | A01G 7/045 |
| 2018/0308028 | A1* | 10/2018 | Zhang | G05B 19/41835 |
| 2020/0260669 | A1* | 8/2020 | Kim | A01G 31/02 |

* cited by examiner

MODULAR HYDROPONIC GROWING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and horticulture including receptacles and greenhouses, more specifically, a greenhouse bench structure.

SUMMARY OF INVENTION

The modular hydroponic growing system comprises a collection of one or more independent growing units. Each of the independent growing units provides a controlled enclosed environment for growing plants. Each of the independent growing units monitors and controls the temperature and moisture levels in the controlled enclosed environment. Each of the independent growing units monitors and controls the level of nutrients provided to the growing plants. Each of the independent growing units is identical. Each of the independent growing units comprises a container, a lid, and a management system. The management system and the lid attach to the container. The lid provides access into the controlled enclosed environment. The lid encloses the controlled enclosed environment. The management system monitors and controls the temperature and moisture levels in the controlled enclosed environment. The management system monitors and controls the level of nutrients provided to the growing plants.

These together with additional objects, features and advantages of the modular hydroponic growing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular hydroponic growing system in detail, it is to be understood that the modular hydroponic growing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular hydroponic growing system.

It is therefore important that the claims be regarded as including such equivalent construction insofar as they do not depart from the spirit and scope of the modular hydroponic growing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
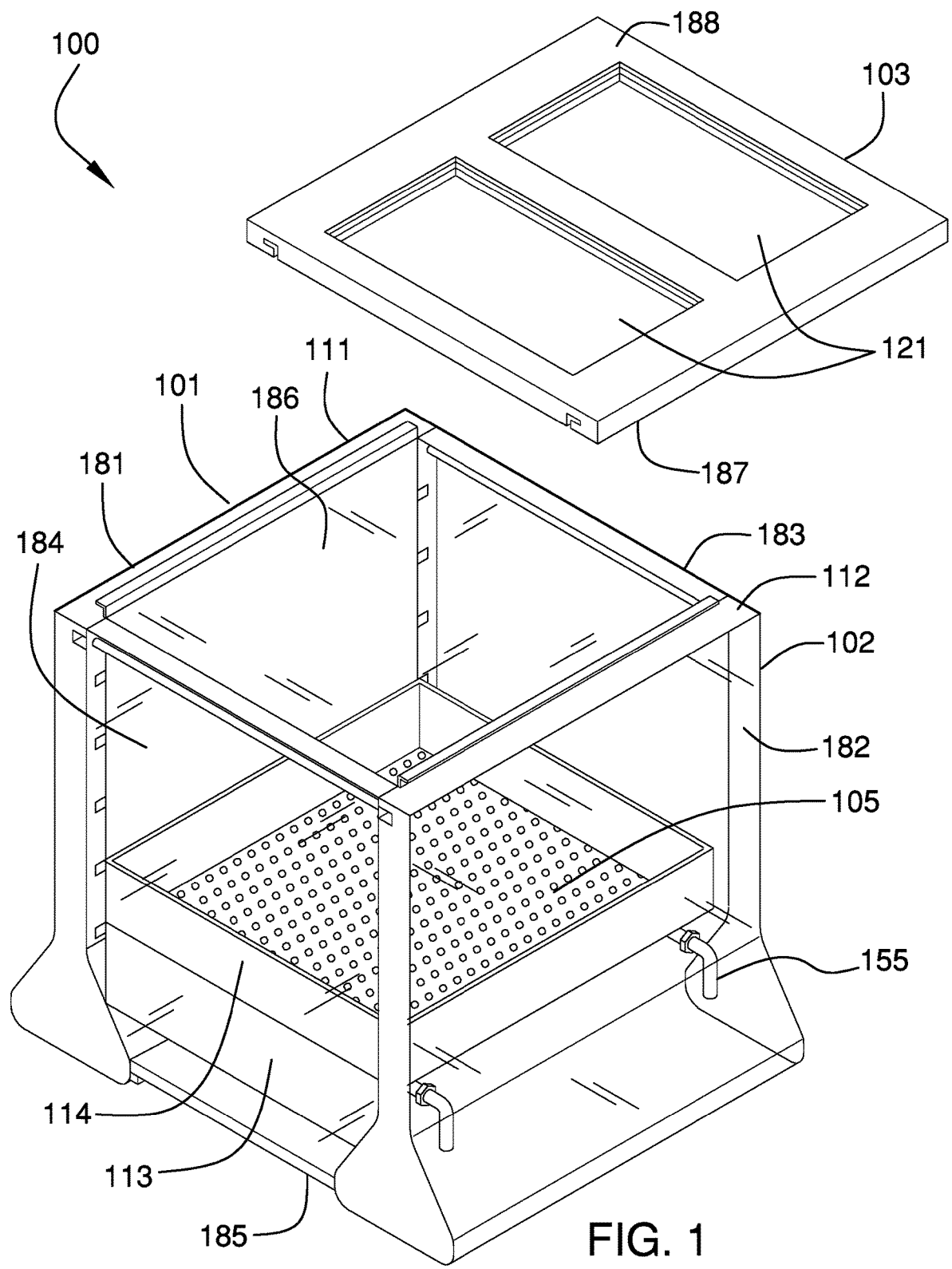
FIG. 1 is a perspective view of an embodiment of the disclosure.
Figure 2:
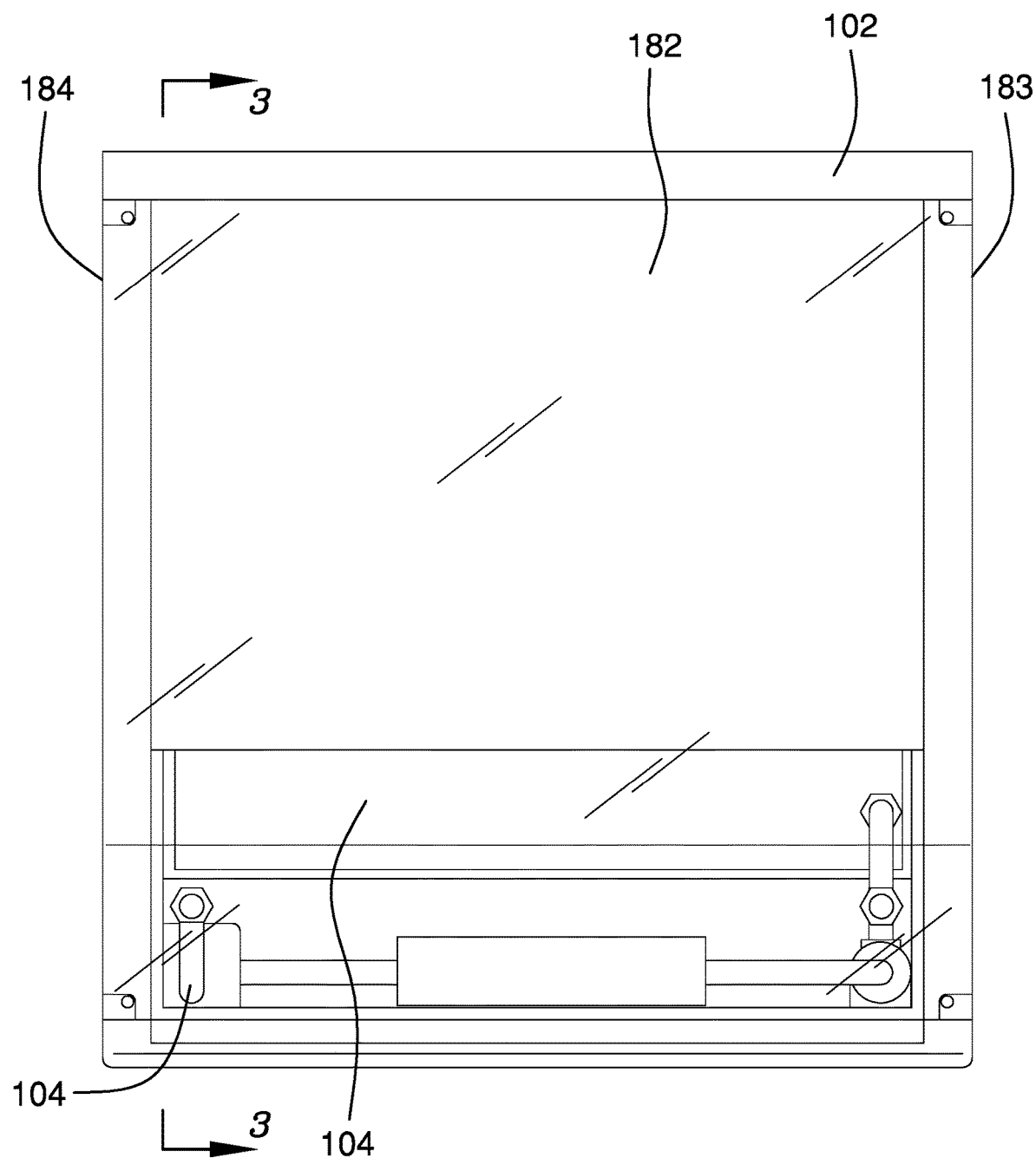
FIG. 2 is a front view of an embodiment of the disclosure.
Figure 3:
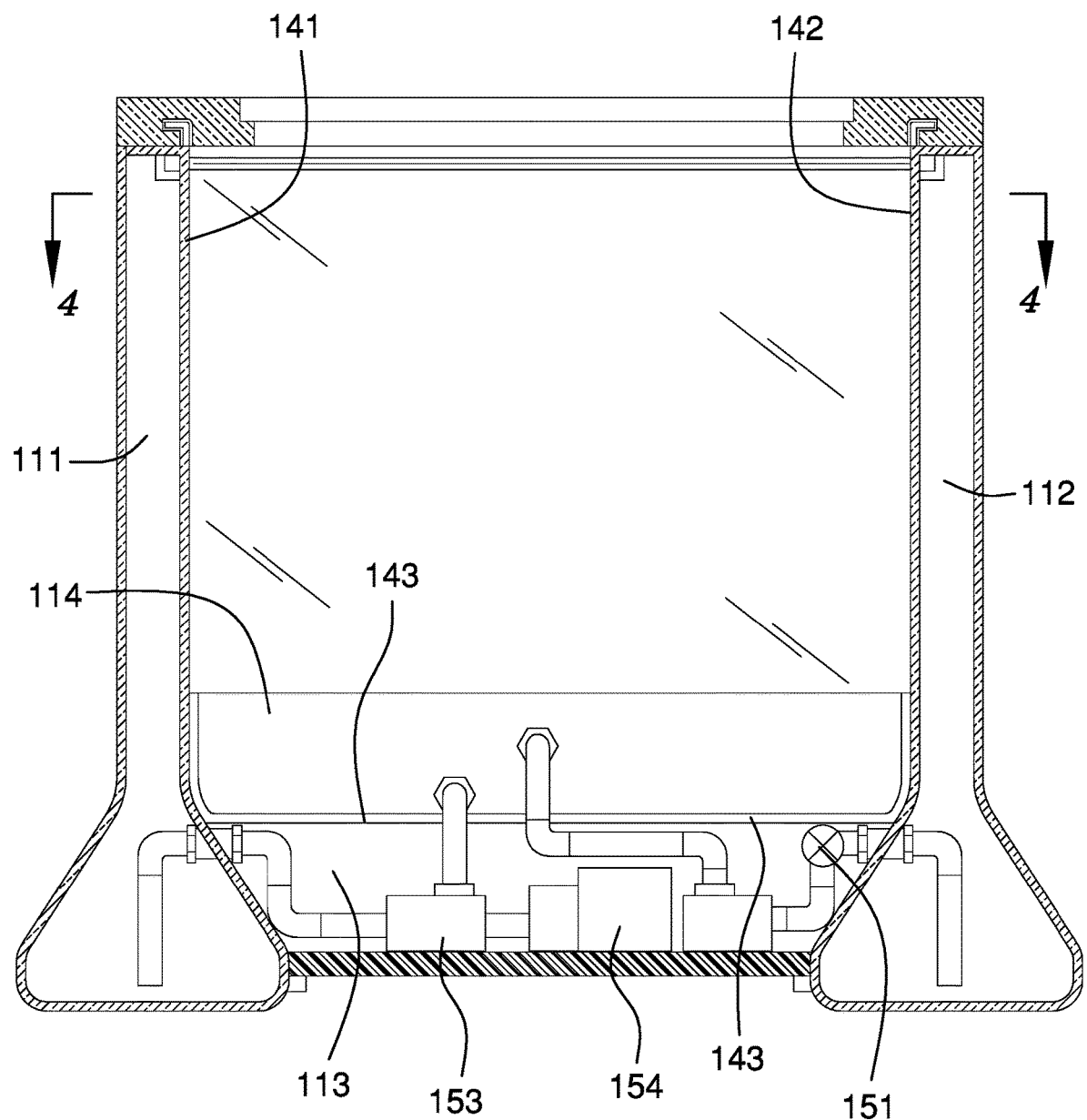
FIG. 3 is a cross-sectional view of an embodiment of the disclosure across 3-3 as shown in FIG. 2.
Figure 4:
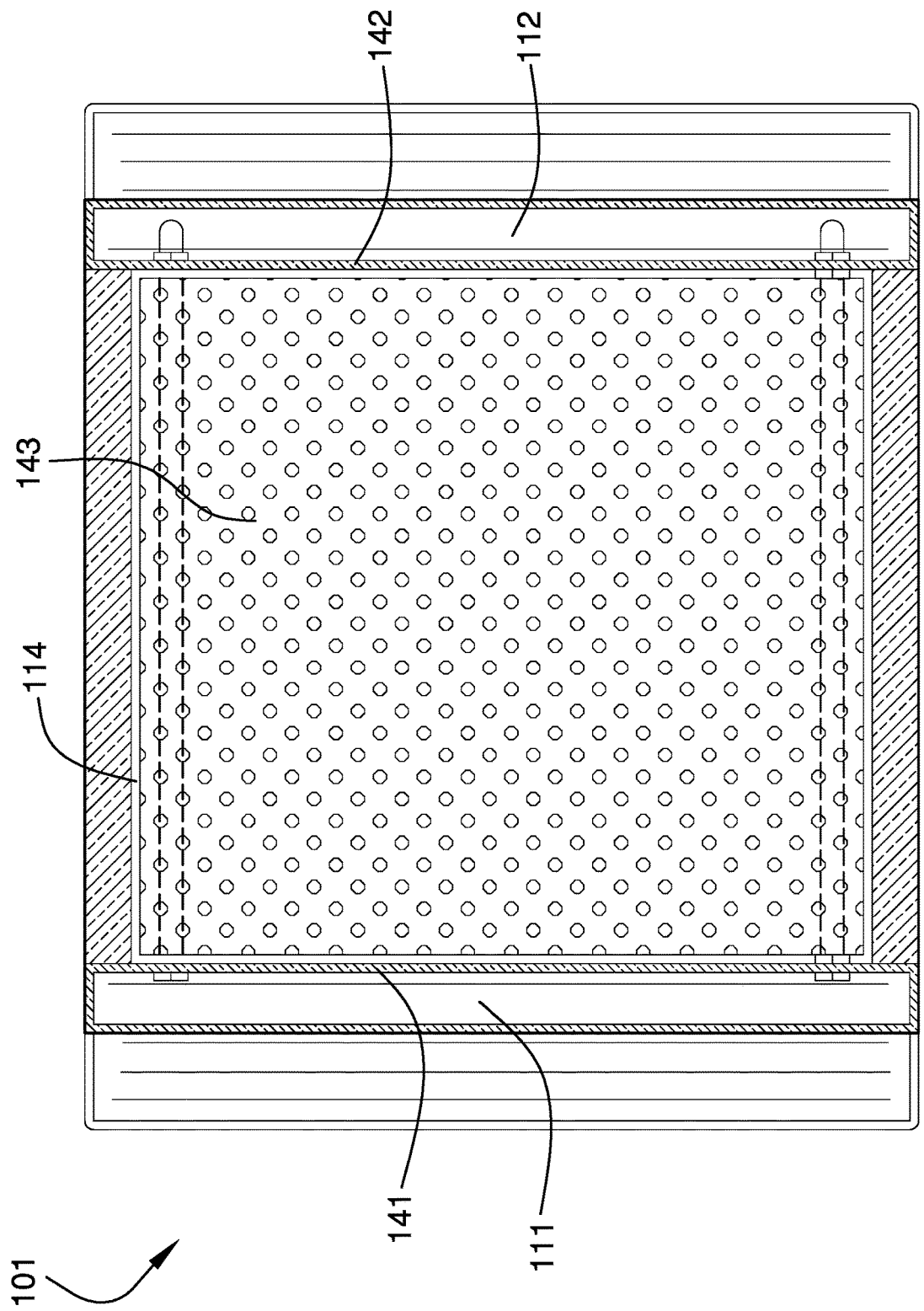
FIG. 4 is a cross-sectional view of an embodiment of the disclosure across 4-4 as shown in FIG. 3.
Figure 5:
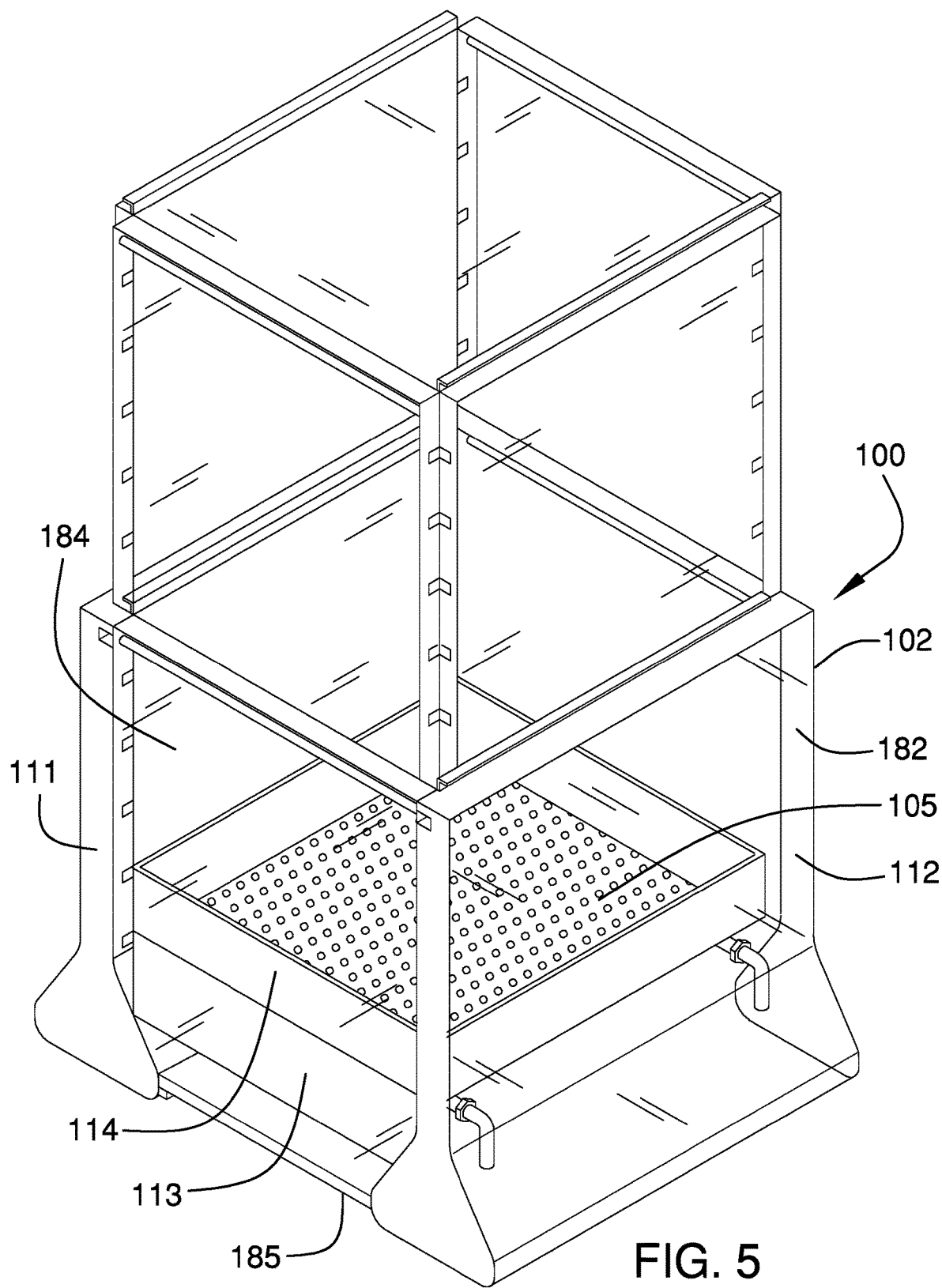
FIG. 5 is a top, perspective view of an embodiment of the disclosure.
Figure 6:
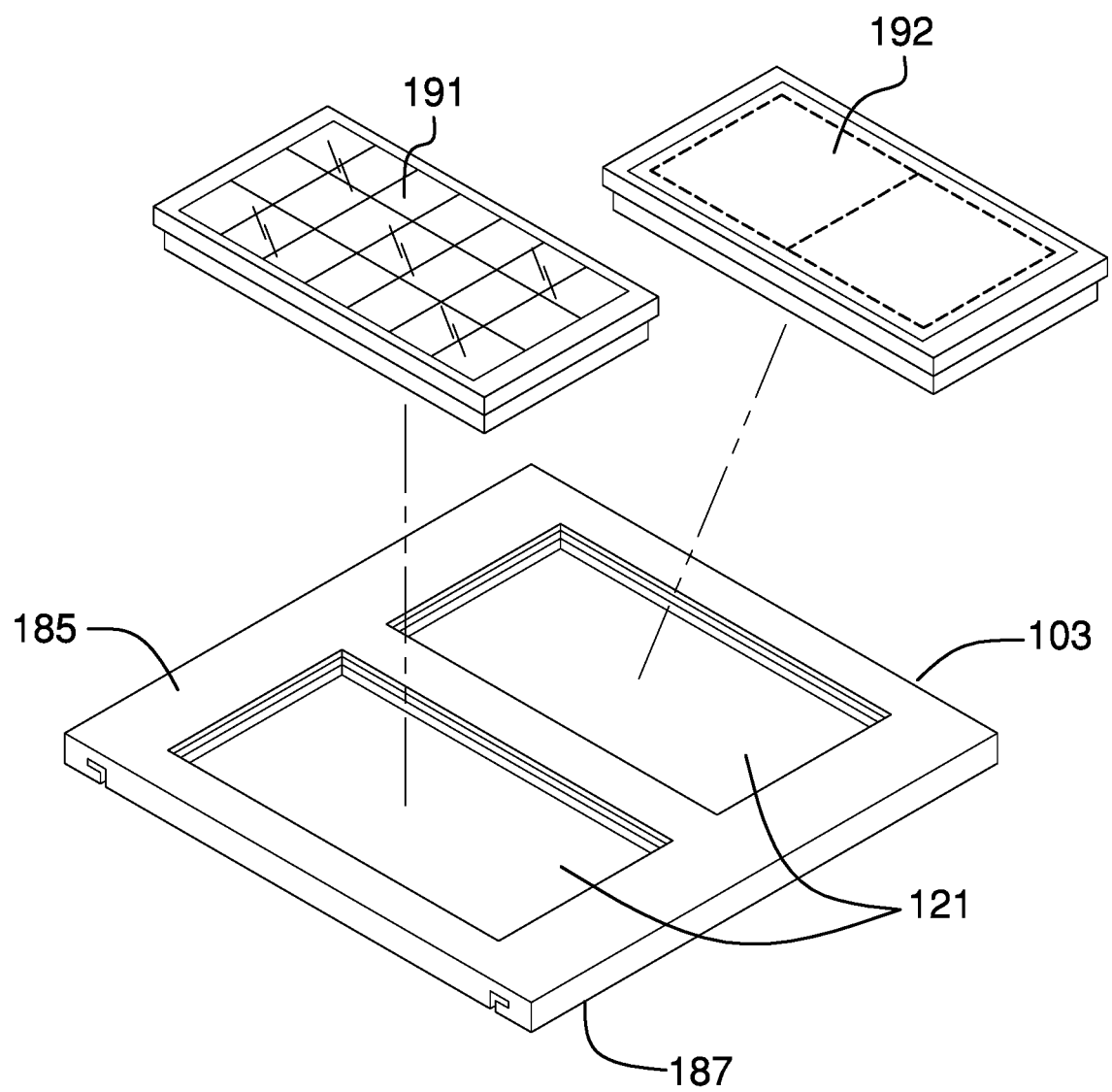
FIG. 6 is another perspective view of a lid of the disclosure.
Figure 7:
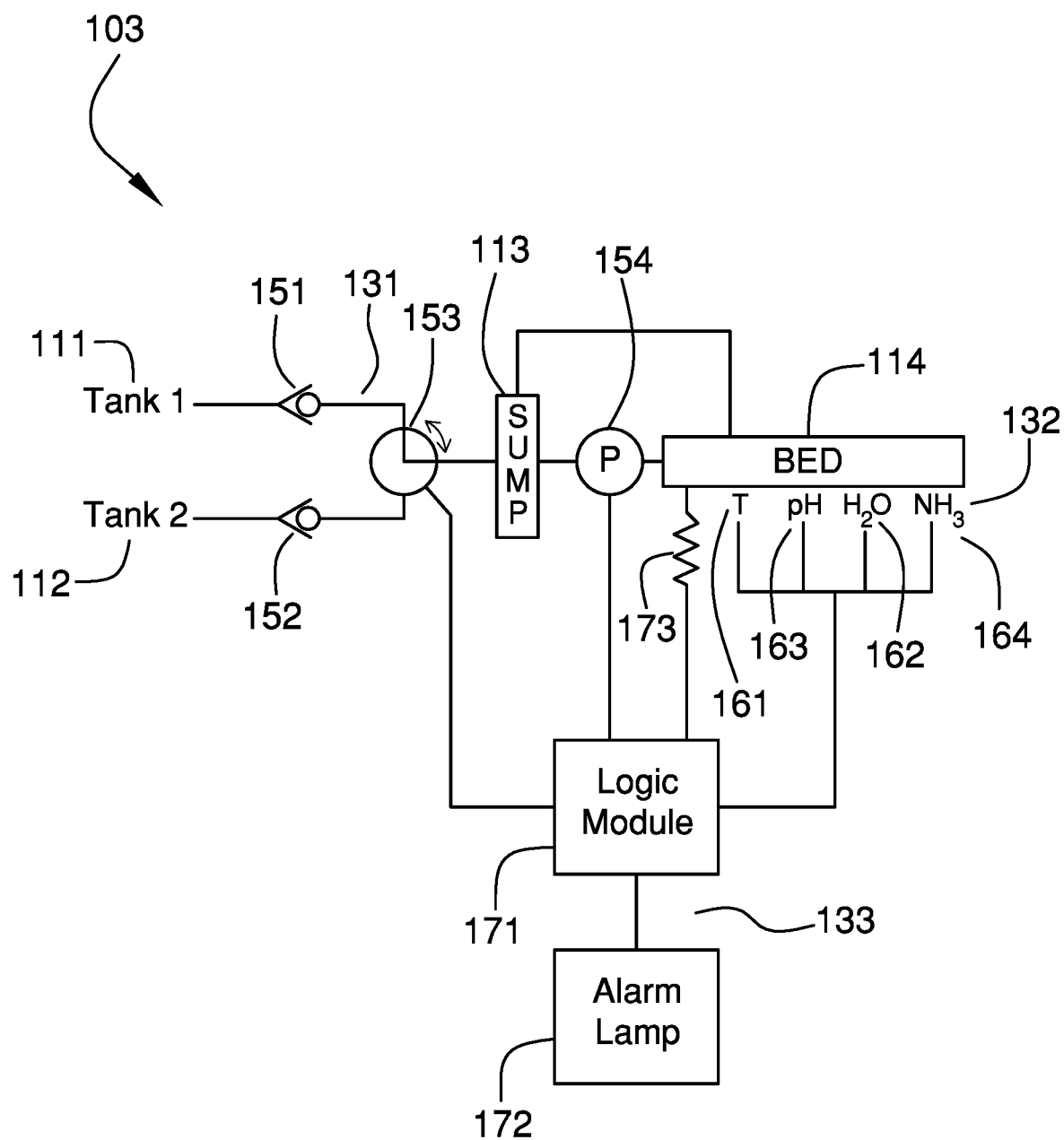
FIG. 7 is a schematic view of an embodiment of the disclosure.

Detailed reference will now be made to one or more potential embodiments of the disclosure, which are illustrated in FIGS. 1 through 7.

The modular hydroponic growing system 100 (hereinafter invention) comprises a collection of one or more independent growing units 101. Each independent growing unit 101 provides a controlled enclosed environment for one or more growing plants. Each independent growing unit 101 monitors and controls the temperature and moisture levels in the controlled enclosed environment. Each independent growing unit 101 monitors and controls the level of nutrients provided to the one or more growing plants. Each independent growing unit 101 is identical. Each independent growing unit 101 comprises a container 102, a lid 103, and a management system 104. The management system 104 and the lid 103 attach to the container 102. The lid 103 provides access into the controlled enclosed environment. The lid 103 encloses the controlled enclosed environment. The management system 104 monitors and controls the temperature and moisture levels in the controlled enclosed environment. The management system 104 monitors and controls the level of nutrients provided to the one or more growing plants.

The independent growing unit 101 is a modular and self-contained unit. The independent growing unit 101 provides a controlled and enclosed environment for one or more growing plants. Any first independent growing unit 101 is independent of any second independent growing unit 101. By independent is meant that any first independent growing unit 101 is operated and controlled independently from any second independent growing unit 101. A plurality of independent growing units 101 can be stacked upon each other while operating.

Each independent growing unit 101 is configured for use with a growth substrate 105. In a hydroponic scenario, the growth substrate 105 is an inert substrate such as sand or gravel used to stabilize and protect the plants while in the independent growing unit 101. The independent growing unit 101 is also configurable to use soil in as the growth substrate 105.

The container 102 is a hollow rectangular block structure. The interior of the container 102 forms the controlled enclosed environment. The container 102 has a cubic shape. The container 102 forms a pan structure that allows access into the controlled enclosed environment of the container 102. The container 102 comprises a first solution tank 111, a second solution tank 112, a sump 113, and a growing bed 114. The container 102 is further defined with a first face 181, a second face 182, a third face 183, a fourth face 184, a fifth face 185, and a sixth face 186.

The first face 181 is a vertical face of the container 102. The first face 181 forms a vertical boundary of the first solution tank 111. The second face 182 is a vertical face of the container 102. The second face 182 forms a vertical boundary of the second solution tank 112. The second face 182 is distal from the first face 181.

The third face 183 is a vertical face of the container 102. The third face 183 is perpendicular to both the first face 181 and the second face 182. The fourth face 184 is a vertical face of the container 102. The fourth face 184 is perpendicular to both the first face 181 and the second face 182. The fourth face 184 is distal from the third face 183.

The fifth face 185 is the closed inferior surface of the pan structure that forms the container 102. The sixth face 186 is the open superior surface of the pan structure that forms the container 102. The sixth face 186 is distal from the fifth face 185.

The first solution tank 111 is a tank that is formed within the container 102. The first solution tank 111 is configured to store a water-based solution of nutrients which is distributed to the one or more growing plants by the management system 104. The first solution tank 111 is segregated from the chamber in which the one or more growing plants are maintained. The first solution tank 111 further comprises a first bulkhead 141.

The first bulkhead 141 is a plate that forms a fluid impermeable surface installed within the container 102. The first bulkhead 141 installs in a position parallel to the first face 181 of the container 102 such that the first solution tank 111 is formed between the first bulkhead 141 and the first face 181 of the container 102.

The second solution tank 112 is a tank that is formed within the container 102. The second solution tank 112 is configured to store a water-based solution of nutrients which is distributed to the one or more growing plants by the management system 104. The second solution tank 112 is segregated from the chamber in which the one or more growing plants are maintained. The second solution tank 112 further comprises a second bulkhead 142.

The second bulkhead 142 is a plate that forms a fluid impermeable surface installed within the container 102. The second bulkhead 142 installs in a position parallel to the second face 182 of the container 102 such that the second solution tank 112 is formed between the second bulkhead 142 and the second face 182 of the container 102.

The sump 113 is a chamber located below the growing bed 114. The sump 113 receives and stores any nutrient solution that drains from the growing bed 114.

The growing bed 114 is a hollow rectangular block structure. The growing bed 114 is a pan that mounts in the independent growing unit 101. The growing bed 114 elevates the growth substrate 105 and the one or more growing plants above the sump 113. The growing bed 114 further comprises a foraminous surface 143.

The foraminous surface 143 forms the inferior surface of the growing bed 114. The foraminous surface 143 is positioned proximal to the sump 113. The foraminous surface 143 is positioned distal from the open face of the pan structure of the growing bed 114. The foraminous surface 143 is formed with a plurality of apertures such that excess moisture from the growth substrate 105 contained within the growing bed 114 drains into the sump 113.

The lid 103 is a rectangular block structure. The lid 103 forms a disk. The lid 103 encloses the controlled enclosed environment formed by the container 102. The lid 103 is geometrically similar to the open face of the pans structure of the container 102 such that the lid 103 encloses the container 102 when the lid 103 is placed on the container 102. The lid 103 further comprises a plurality of cutouts 121. The lid 103 is further defined with a seventh face 187 and an eighth face 188.

The seventh face 187 is the end of the disk structure that forms the lid 103 that is proximal to the sixth face 186 of the container 102 during normal use of the invention 100. The eighth face 188 is the end of the disk structure that forms the lid 103 is distal from the seventh face 187.

Each of the plurality of cutouts 121 is an aperture formed through the lid 103 from the seventh face 187 of the disk structure of the lid 103 to the eighth face 188 of the disk structure of the lid 103. Each of the plurality of cutouts 121 is sized to receive a mechanical structure such as a photovoltaic cell 191, a battery 192, a lamp, and a fan. The lamp and the fan offer the ability to enhance the growing environment within the invention 100. The photovoltaic cell 191 and the battery 192 create a self-contained source of electrical energy used to power the management system 104.

The management system 104 monitors and controls the temperature and moisture levels in the controlled enclosed environment provided by the container 102. The management system 104 monitors and controls the nutrient levels available to the one or more growing plants contained in the controlled enclosed environment of the container 102. The management system 104 comprises a moisture maintenance system 131, a sensor system 132, and a control system 133.

The moisture maintenance system 131 is a component of the management system 104. The moisture maintenance system 131 distributes the nutrient solution to the one or more growing plants maintained in the growing bed 114. The moisture maintenance system 131 comprises a first check valve 151, a second check valve 152, a solenoid valve 153, a pump 154, and a leveling structure 155.

The first check valve 151 is a ball valve that limits the flow of the nutrient solution from the first solution tank 111 into the solenoid valve 153. The second check valve 152 is a ball valve that limits the flow of the nutrient solution from the second solution tank 112 into the solenoid valve 153.

The solenoid valve 153 is a commercially available three port solenoid valve 153. The solenoid valve 153 is controlled by the control system 133 of the management system 104. The solenoid valve 153 routes nutrient solution from a selected tank to the sump 113. The selected tank is selected from the group consisting of the first solution tank 111 and the second solution tank 112. The nutrient solution is gravity fed into the sump 113 through the solenoid valve 153.

The pump 154 is a mechanical device that generates a pressure differential which is used for transporting the nutrient solution from the sump 113 to the growing bed 114. The operation of the pump 154 is controlled by the control system 133 of the management system 104.

The leveling structure 155 is a piping structure that forms a fluidic connection between the first solution tank 111 and the second solution tank 112. The leveling structure 155 transfers any overfilling of a first tank selected from the group consisting of the first solution tank 111 and the second solution tank 112 to the unselected tank from the same group.

The leveling structure 155 comprises a plurality of rigid pipes that are positioned between the growing bed 114 and the sump 113. The leveling structure 155 forms a horizontal surface upon which the growing bed 114 rests such that the growing bed 114 is elevated above the sump 113.

The sensor system 132 is a component of the management system 104. The sensor system 132 measures the temperature within the container 102. The sensor system 132 measures the level of nutrient accessible to the one or more growing plants in the container 102. The sensor system 132 measures the moisture level in the growth substrate 105 within the container 102. The sensor system 132 is monitored by the control system 133. The sensor system 132 comprises a temperature sensor 161, a soil moisture sensor 162, a pH sensor 163, and an ammonia sensor 164.

The temperature sensor 161 is a commercially available electrically operated sensor. The temperature sensor 161 generates an electrically detectable signal which is a function of the temperature within the container 102. The control system 133 monitors and acts on the electrically detectable signal generated by the temperature sensor 161.

The soil moisture sensor 162 is a commercially available electrically operated sensor. The soil moisture sensor 162 generates an electrically detectable signal which is a function of the moisture level of the growth substrate 105 within the growing bed 114. The control system 133 monitors and acts on the electrically detectable signal generated by the soil moisture sensor 162.

The pH sensor 163 is a commercially available electrically operated sensor. The pH sensor 163 generates an electrically detectable signal which is a function of the pH level of the nutrient solution contained within the sump 113. The control system 133 monitors and acts on the electrically detectable signal generated by the pH sensor 163. The pH sensor 163 measures the ionic content of the nutrient solution which indicates the mineral level contained within the nutrient solution.

The ammonia sensor 164 is a commercially available electrically operated sensor. The ammonia sensor 164 generates an electrically detectable signal which is a function of the gaseous ammonia (NH3 CAS 7664-41-7) that has evaporated from the nutrient solution contained within the sump 113. The control system 133 monitors and acts on the electrically detectable signal generated by the ammonia sensor 164. The ammonia sensor 164 measures the amount of gaseous ammonia released from the nutrient solution which indicates the nitrogen level contained within the nutrient solution.

The control system 133 is a feedback based electrical device that controls the environment within the container 102 based on the readings measured by the sensor system 132. The control system 133 comprises a logic module 171, an alarm lamp 172, and a heating element 173.

The logic module 171 is a programmable electrical device that: a) individually monitors each sensor contained in the sensor system 132; and, b) takes action based on the readings received from each of the sensor system 132.

The logic module 171 activates the heating element 173 in response to the temperature sensor 161 indicating that the temperature in the container 102 is too cold.

The logic module 171 activates the pump 154 in response to the soil moisture sensor 162 indicating that the soil moisture in the growth substrate 105 is too low.

The logic module 171 activates the alarm lamp 172 in response to the pH sensor 163 indicating a pH imbalance in the nutrient solution contained in the sump 113.

The logic module 171 activates the alarm lamp 172 in response to the ammonia sensor 164 indicating inadequate levels of nitrogen in the nutrient solution contained in the sump 113.

The alarm lamp 172 is a lamp that is illuminated by the logic module 171 indicating that a water-soluble nutrient compound should be added to the nutrient solution contained in the first solution tank 111 and the second solution tank 112.

The heating element 173 is a commercially available resistive heating device used to warm the controlled enclosed environment provided in the container 102. The heating element 173 is described in greater detail elsewhere in this disclosure.

The following definitions were used in this disclosure:

Ammonia: As used in this disclosure, ammonia (CAS 7664-41-7) refers to a chemical compound with the formula NH3. The chemical term ammonium (CAS 14789-03-9) refers to an ammonia molecule that has formed a hydrogen bond with a hydrogen ion. Ammonium has the chemical formula NH4+. The chemical quaternary ammonium (CAS 8001-54-5) refers to a chemical compound wherein the hydrogen elements of ammonium, including the hydrogen-bonded hydrogen ion are replaced with other molecules or atoms (potentially including hydrogen).

Aperture: As used in this disclosure, an aperture is a prism-shaped negative space that is formed completely through a structure or the surface of a structure.

Ball Valve: As used in this disclosure, a ball valve is a type of commercially available check valve.

Battery: As used in this disclosure, a battery is a chemical device consisting of one or more cells, in which chemical energy is converted into electricity and used as a source of power. Batteries are commonly defined with a positive terminal and a negative terminal.

Bulkhead: As used in this disclosure, a bulkhead is a vertical barrier, often referred to as a wall, which subdivides a space into compartments.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Check Valve: As used in this disclosure, a check valve is a valve that permits the flow of fluid or gas in a single direction. Within selected potential embodiments of this disclosure, the check valve is a commercially available product that is selected from the group consisting of a ball valve and a Tesla valve.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. In this disclosure, the surface area of the ends of the prism-shaped object that forms the disk is greater than the lateral face of the prism-shaped object that forms the disk. In this disclosure, the ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on. The infinitive form of elevation is to elevate.

Foraminous: As used in this disclosure, foraminous is an adjective that describes a surface, plate, or platform that is perforated with a plurality of holes.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), or platinum.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Ion: As used in this disclosure, an ion is an atom or a molecule with a net electric charge.

Ionic Bond: As used within this disclosure, an ionic bond refers to a chemical bond between a first atom and a second atom wherein the first atom takes an electron from the second atom. This is in contrast to a covalent bond.

Lamp: As used in this disclosure, a lamp is a two-terminal electrical device that generates (typically visible) electromagnetic radiation.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is an open prism-shaped containment structure. The superior structure of the pan is open when the pan is used normally. The superior structure is a horizontal surface selected from the group consisting of an end or a lateral face of the prism structure that forms the pan.

Photovoltaic Cell: As used in this disclosure, a photovoltaic cell is an electrical device that directly converts light energy into electrical energy.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two-port solenoid valve opens or closes to fluid flow through the valve portion of the solenoid valve. A three port solenoid valve switched fluid or gas flow between a first port and a second port to either feed or be fed from a third port.

Sump: As used in this disclosure, the sump is a chamber used to receive drained fluids.

Superior: As used in this disclosure, the term superior refers to a directional reference that is parallel to and in the opposite direction of the force of gravity.

Tesla Valve: As used in this disclosure, a Tesla valve is a type of check valve that requires the use of no moving parts.

Transparent: As used in this disclosure, transparent refers to a material that allows light to pass through the material without significant scattering such that an object can be clearly seen through the material.

Valve: As used in this disclosure, a valve is a device that is used to control the flow of a fluid (gas or liquid) through a pipe.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A modular growing system comprising:
a collection of one or more independent growing units;
wherein each independent growing unit provides a controlled enclosed environment for one or more growing plants;
wherein each independent growing unit monitors and controls the temperature and moisture levels in the controlled enclosed environment;
wherein each independent growing unit monitors and controls the level of nutrients provided to the one or more growing plants;
wherein each independent growing unit is identical;
wherein each independent growing unit comprises a container, a lid, and a management system;
wherein the management system and the lid attach to the container;
wherein the lid encloses the controlled enclosed environment;
wherein the management system monitors and controls the temperature and moisture levels in the controlled enclosed environment;
wherein the management system monitors and controls the level of nutrients provided to the one or more growing plants;
wherein the container comprises a first solution tank, a second solution tank, a sump, and a growing bed;
wherein the first solution tank, the second solution tank, the sump, and the growing bed are contained within the controlled enclosed environment of the container;
wherein the container is further defined with a first face, a second face, a third face, a fourth face, a fifth face, and a sixth face;
wherein the first solution tank further comprises a first bulkhead;
wherein the first bulkhead is a plate that forms a fluid impermeable surface within the container;
wherein the first bulkhead installs in a position parallel to the first face of the container such that the first solution tank is formed between the first bulkhead and the first face of the container;
wherein the second solution tank further comprises a second bulkhead;
wherein the second bulkhead is a plate that forms a fluid impermeable surface installed within the container;
wherein the second bulkhead installs in a position parallel to the second face of the container such that the second solution tank is formed between the second bulkhead and the second face of the container.

2. The modular growing system according to claim 1
wherein the independent growing unit is a modular unit;
wherein the independent growing unit is a self-contained unit;
wherein any first independent growing unit is independent of any second independent growing unit;
wherein by independent is meant that any first independent growing unit is operated and controlled independently from any second independent growing unit;
wherein a plurality of independent growing units can be stacked upon each other while operating;

wherein each independent growing unit is configured for use with a growth substrate.

3. The modular growing system according to claim 2
wherein the container is a hollow rectangular block structure;
wherein the interior of the container forms the controlled enclosed environment;
wherein the container has a cubic shape;
wherein the container forms a pan structure.

4. The modular growing system according to claim 3
wherein the lid is a rectangular block structure;
wherein the lid forms a disk;
wherein the lid is geometrically similar to the open face of the pans structure of the container such that the lid encloses the container when the lid is placed on the container.

5. The modular growing system according to claim 4
wherein the first solution tank is a tank that is formed within the container;
wherein the first solution tank is configured to store a water-based solution of nutrients which is distributed to the one or more growing plants by the management system;
wherein the first solution tank is segregated from the chamber in which the one or more growing plants are maintained;
wherein the second solution tank is a tank that is formed within the container;
wherein the second solution tank is configured to store a water-based solution of nutrients which is distributed to the one or more growing plants by the management system;
wherein the second solution tank is segregated from the chamber in which the one or more growing plants are maintained.

6. The modular growing system according to claim 5
wherein the growing bed is a hollow rectangular block structure;
wherein the growing bed is a pan that mounts in the independent growing unit;
wherein the growing bed elevates the growth substrate and the one or more growing plants above the sump;
wherein the sump is a chamber located below the growing bed;
wherein the sump receives and stores any nutrient solution that drains from the growing bed.

7. The modular growing system according to claim 6
wherein the growing bed further comprises a foraminous surface;
wherein the foraminous surface forms the inferior surface of the growing bed;
wherein the foraminous surface is positioned proximal to the sump;
wherein the foraminous surface is positioned distal from the open face of the pan structure of the growing bed;
wherein the foraminous surface is formed with a plurality of apertures.

8. The modular growing system according to claim 7
wherein the lid further comprises a plurality of cutouts;
wherein the lid is further defined with a seventh face and an eighth face;
wherein each of the plurality of cutouts is an aperture formed through the lid from the seventh face of the disk structure of the lid to the eighth face of the disk structure of the lid.

9. The modular growing system according to claim 8
wherein the management system monitors and controls the temperature and moisture levels in the controlled enclosed environment provided by the container;
wherein the management system monitors and controls the nutrient levels available to the one or more growing plants contained in the controlled enclosed environment of the container;
wherein the management system comprises a moisture maintenance system, a sensor system, and a control system;
wherein the moisture maintenance system is a component of the management system;
wherein the moisture maintenance system distributes the nutrient solution to the one or more growing plants maintained in the growing bed;
wherein the sensor system measures the temperature within the container;
wherein the sensor system measures the level of nutrient accessible to the one or more growing plants in the container;
wherein the sensor system measures the moisture level in the growth substrate within the container;
wherein the sensor system is monitored by the control system;
wherein the control system is a feedback based electrical device that controls the environment within the container based on the readings measured by the sensor system.

10. The modular growing system according to claim 9
wherein the moisture maintenance system comprises a first check valve, a second check valve, a solenoid valve, a pump, and a leveling structure;
wherein the first check valve, the second check valve, the solenoid valve, and the pump are fluidically connected;
wherein the leveling structure forms a fluidic connection between the first solution tank and the second solution tank;
wherein the leveling structure elevates the growing bed above the sump.

11. The modular growing system according to claim 10
wherein the sensor system comprises a temperature sensor, a soil moisture sensor, a pH sensor, and an ammonia sensor;
wherein the temperature sensor is an electrically operated sensor;
wherein the temperature sensor generates an electrically detectable signal which is a function of the temperature within the container;
wherein the soil moisture sensor is an electrically operated sensor;
wherein the soil moisture sensor generates an electrically detectable signal which is a function of the moisture level of the growth substrate within the growing bed;
wherein the pH sensor is an electrically operated sensor;
wherein the pH sensor generates an electrically detectable signal which is a function of the pH level of the nutrient solution contained within the sump;
wherein the ammonia sensor is an electrically operated sensor;
wherein the ammonia sensor generates an electrically detectable signal which is a function of the gaseous ammonia ($NH_3$ CAS 7664-41-7) that has evaporated from the nutrient solution contained within the sump.

12. The modular growing system according to claim 11
wherein the control system comprises a logic module, an alarm lamp, and a heating element;

wherein the logic module, the alarm module, the heating element, and the sensor system are electrically interconnected;

wherein the logic module is a programmable electrical device that individually monitors each sensor contained in the sensor system; and, b) takes action based on the readings received from each of the sensor system.

13. The modular growing system according to claim 12 wherein the first check valve is a ball valve;

wherein the second check valve is a ball valve;

wherein the first check valve limits the flow of the nutrient solution from the first solution tank into the solenoid valve;

wherein the second check valve limits the flow of the nutrient solution from the second solution tank into the solenoid valve.

14. The modular growing system according to claim 13 wherein the solenoid valve is a three port solenoid valve;

wherein the solenoid valve is controlled by the control system of the management system;

wherein the solenoid valve routes nutrient solution from a selected tank to the sump;

wherein the selected tank is selected from the group consisting of the first solution tank and the second solution tank.

15. The modular growing system according to claim 14 wherein the pump is a mechanical device that generates a pressure differential used for transporting the nutrient solution from the sump to the growing bed;

wherein the operation of the pump is controlled by the control system of the management system.

16. The modular growing system according to claim 15 wherein the control system monitors and acts on the electrically detectable signal generated by the temperature sensor;

wherein the control system monitors and acts on the electrically detectable signal generated by the soil moisture sensor;

wherein the control system monitors and acts on the electrically detectable signal generated by the pH sensor;

wherein the control system monitors and acts on the electrically detectable signal generated by the ammonia sensor.

17. The modular growing system according to claim 16 wherein the logic module activates the heating element in response to the temperature sensor indicating that the temperature in the container is too cold;

wherein the logic module activates the pump in response to the soil moisture sensor indicating that the soil moisture in the growth substrate is too low;

wherein the logic module activates the alarm lamp in response to the pH sensor indicating a pH imbalance in the nutrient solution contained in the sump;

wherein the logic module activates the alarm lamp in response to the ammonia sensor indicating inadequate levels of nitrogen in the nutrient solution contained in the sump.

18. The modular growing system according to claim 17 wherein the heating element is a resistive heating device.

* * * * *